US010732916B2

(12) United States Patent
Rodriguez et al.

(10) Patent No.: US 10,732,916 B2
(45) Date of Patent: Aug. 4, 2020

(54) MULTI-DEVICE DISPLAY PROCESSING (71) Applicant: NCR Corporation, Duluth, GA (US)

(72) Inventors: Omar Javier Rodriguez, College Station, TX (US); Brett Jamison Wolfe, College Station, TX (US)

(73) Assignee: NCR Corporation, Atlanta, GA (US)

(*) Notice: Subject to any disclaimer, the term of this patent is extended or adjusted under 35 U.S.C. 154(b) by 149 days.

(21) Appl. No.: 15/824,759

(22) Filed: Nov. 28, 2017

(65) Prior Publication Data
US 2019/0163431 A1 May 30, 2019

(51) Int. Cl.
G06F 3/14 (2006.01)
G09G 5/12 (2006.01)
H04L 29/08 (2006.01)
G06T 13/00 (2011.01)
H04W 76/10 (2018.01)
H04L 29/06 (2006.01)
G10L 15/26 (2006.01)

(52) U.S. Cl.
CPC ............ *G06F 3/1423* (2013.01); *G06T 13/00* (2013.01); *G09G 5/12* (2013.01); *H04L 67/104* (2013.01); *H04L 67/1095* (2013.01); *H04L 67/38* (2013.01); *H04W 76/10* (2018.02); *G10L 15/26* (2013.01)

(58) Field of Classification Search
CPC ..... G06F 3/1423; H04L 67/38; H04L 67/104; H04L 67/1095; H04W 76/10; G09G 5/12; G06T 13/00; G10L 15/26
See application file for complete search history.

(56) References Cited

U.S. PATENT DOCUMENTS

| 5,923,307 | A | * | 7/1999 | Hogle, IV | G06F 3/04897 345/1.3 |
| 8,961,307 | B2 | * | 2/2015 | Akifusa | A63F 13/26 463/30 |
| 9,086,837 | B1 | * | 7/2015 | Kang | G06F 3/016 |
| 9,787,731 | B2 | * | 10/2017 | Dere | G06F 3/042 |
| 9,817,447 | B2 | * | 11/2017 | Song | G06F 3/0346 |
| 9,894,115 | B2 | * | 2/2018 | Kim | H04L 65/403 |
| 2003/0101235 | A1 | * | 5/2003 | Zhang | H04L 51/04 709/218 |
| 2011/0124385 | A1 | * | 5/2011 | Otomo | A63F 13/10 463/3 |
| 2012/0050331 | A1 | * | 3/2012 | Kanda | G06F 3/1454 345/649 |
| 2012/0075334 | A1 | * | 3/2012 | Pourbigharaz | G06F 3/1438 345/619 |
| 2013/0083240 | A1 | * | 4/2013 | Kerr | G06F 3/1446 348/383 |
| 2013/0162502 | A1 | * | 6/2013 | Lee | G09G 5/003 345/1.2 |
| 2013/0176255 | A1 | * | 7/2013 | Kim | G06F 3/1423 345/173 |

(Continued)

*Primary Examiner* — Grant Sitta
(74) *Attorney, Agent, or Firm* — Schwegman, Lundberg & Woessner (57) ABSTRACT Two separate executing agents that execute on two separate devices coordinate to animate objects between two separate displays. The agents take control and pass control of the objects presented on the displays between one another and a common scene can be synchronized between the two displays by the agents. The objects are animated and rendered on the displays by the agents.

20 Claims, 4 Drawing Sheets (56) References Cited

U.S. PATENT DOCUMENTS

| | | | |
|---|---|---|---|
| 2013/0241801 A1* | 9/2013 | Petrik | G06F 3/1423 |
| | | | 345/1.1 |
| 2013/0265487 A1* | 10/2013 | Yu | H04N 9/12 |
| | | | 348/383 |
| 2013/0307796 A1* | 11/2013 | Liu | G06F 3/041 |
| | | | 345/173 |
| 2014/0006152 A1* | 1/2014 | Wissner-Gross | |
| | | | G06Q 30/0269 |
| | | | 705/14.53 |
| 2014/0194066 A1* | 7/2014 | Li | G06F 3/1446 |
| | | | 455/41.3 |
| 2014/0300565 A1* | 10/2014 | Anderson | A63F 13/06 |
| | | | 345/173 |
| 2015/0082241 A1* | 3/2015 | Kang | G06F 3/04845 |
| | | | 715/803 |
| 2016/0180813 A1* | 6/2016 | Zhou | H04W 4/21 |
| | | | 715/761 |
| 2016/0370929 A1* | 12/2016 | Sugimoto | H04N 1/00129 |
| 2017/0011745 A1* | 1/2017 | Navaratnam | G06F 17/30654 |
| 2017/0192663 A1* | 7/2017 | Yang | G06F 1/1698 |
| 2018/0101350 A1* | 4/2018 | Nonaka | A63F 13/428 |
| 2018/0107358 A1* | 4/2018 | Chodakowski | G06F 3/1423 |
| 2018/0174347 A1* | 6/2018 | Chaney | G06T 13/40 |
| 2018/0253148 A1* | 9/2018 | Santamaria | G01C 21/362 |
| 2019/0034150 A1* | 1/2019 | Vigna | G01P 1/07 |

\* cited by examiner

MULTI-DEVICE DISPLAY PROCESSING

BACKGROUND

Typically, multiple displays are synchronized based on specific starting times for each of the displays. Objects that span the multiple displays are deterministic so as to appear to be synchronized but the objects are not capable of handling user interaction. Sometimes animated objects may appear synchronized by synchronizing time and animating the objects at pre-determined (still deterministic) times over specific intervals.

Another approach is to utilize a single computing host to control multiple displays. In this situation, the objects can be interactive and not deterministic but a single host is controlling the objects on the displays. This is similar to extending a user's desktop to two or more displays and objects presented on the display can be moved from display to display through user interaction.

However, this latter approach is inefficient for many reasons. The host can be loaded with other processing, which affects the interaction and animation of the objects adversely. Furthermore, most displays and devices with displays include computing capabilities, such that taking this latter approach leaves processing capabilities on one of the displays underutilized.

Therefore, what is needed is an approach where two or more devices can cooperate to achieve interactive animations of objects presented on the displays of the devices.

SUMMARY

In various embodiments, methods and a system are presented for multi-device display processing.

According to an embodiment, a method for multi-device display processing is presented. Specifically, in an embodiment, a first device identifies a second device over a network connection. A connection between the first device and the second device is established over the network connection. A synchronized scene is set and is presented on a first display of the first device and a second display of the second device. Animated objects are managed as the animated objects are passed back and forth over the network connection while being presented within the synchronized scene on the first display and the second display.

DETAILED DESCRIPTION

Figure 1:
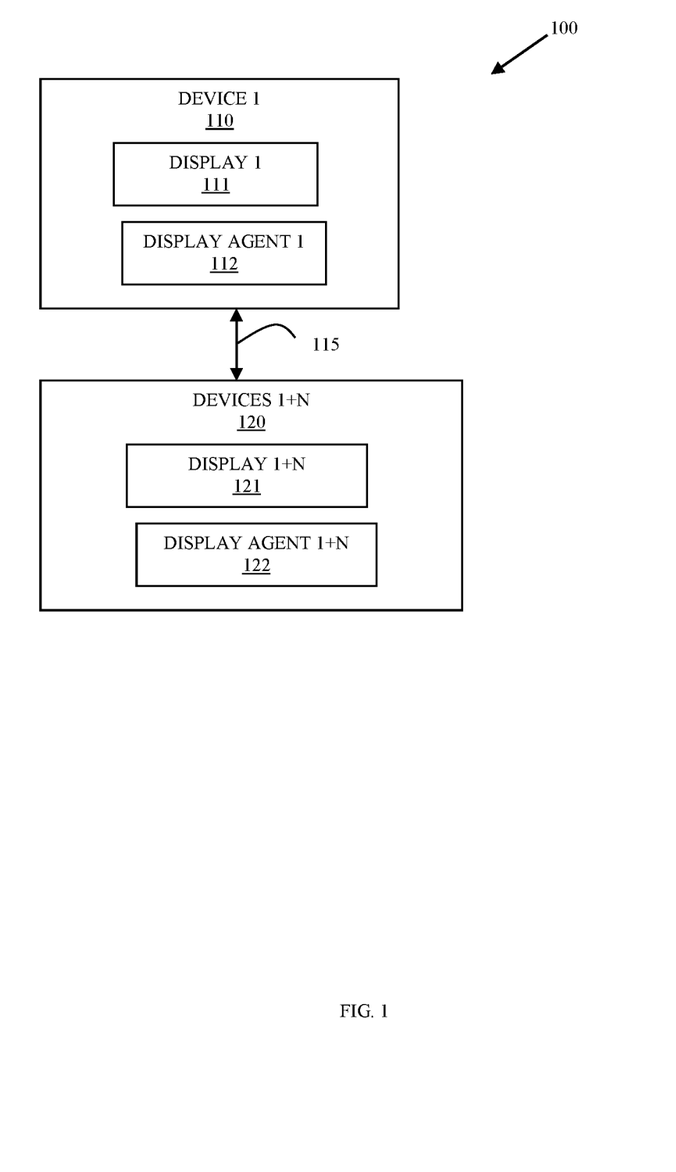
FIG. 1 is a diagram of a system 100 for multi-device display processing, according to an example embodiment.

FIG. 1 is a diagram of a system 100 for multi-device display processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of multi-device display processing presented herein.

The system 100 includes device 1 110 (hereinafter "first device 110") including display 1 111 (hereinafter "first display 111") and display agent 1 112 (hereinafter "first display agent 112"). The system 100 also includes one or more devices N+1 120 (hereinafter "second device 120") have display N+1 (hereinafter "second display 121") and display agent N+1 122 (hereinafter "second display agent 122). It is noted that although reference is made to first and second devices 110 and 120 there is no upward limit on the number of devices participating in the system (notated by the "N+1" notation in the FIG. 1). It is also to be noted that each device 110 and 120 can include more than 1 display.

Each device 110 and 120 minimally also includes at least one hardware processor, memory, and non-transitory storage.

As used herein an "object" refers to a software module that represents a real world item or virtually created item. The object includes attributes, properties, settings, and methods that can be processed by the software module.

An "animated object" is an object that dynamically changes, visually appears to be in motion, and can be interacted with through input devices or touch as it is presented on the displays 111 and 121 of the devices 110 and 111.

The display agents 112 and 222 are software modules that process as executable instructions on the devices 110 and 120. The agents 112 and 222 cooperate and communicate with one another in a Peer-To-Peer (P2P) connection 115. The agents 112 and 122 share processing of objects over the connection and present the visual attributes of the objects on their respective displays 110 and 120. To do this, processing control over any given object can be passed from one agent 112 on one device 110 to the other agent 122 on the other device 120 over the P2P connection.

When a display agent 112 or 122 is initiated for processing on a device 110 or 120, the display agent 122 or 122 searches for another compatible device 110 or 120 that includes another executing instance of the display agent 112 or 122. When the two agents 112 and 122 discover one another a P2P connection is established over Bluetooth®, Bluetooth® Low Energy (BLE), Wi-Fi, etc. using a P2P or Wi-Fi direct protocol after exchanging information.

Each display agent 112 and 122 is configured to establish or discover its display's (111 and 121) capabilities and current settings, pixel density, visible width, visible height, color range, brightness range, whether the display 111 or 121) is touch enabled for receiving touch input, whether the display 111 or 121 includes other input devices for interacting with objects presented on the display (such as mouse, stylus, keyboard, voice input translated to text from a microphone, image processing input from images captured by a camera, etc.), and the like.

One of the two connected agents 112 or 122 can establish a scene for the two connected agents 112 and 122. This can be done through a scene object that has visual and audio attributes and settings configured by one of the agents 112 and 122. The other agent 112 or 122 receives the scene object and establishes the joint scene by processing the scene object. The scene object creates a visual scene when processed on both the displays 111 and 121 and both devices 110 and 120 process their own independent instance of the scene object to establish the joint visual scene that is shared between the two displays 111 and 120. This creates a synchronization of the scene. Each independent scene has its own boundaries that is managed by its agent 112 or 122 based on that agents' display settings (width, height, pixel density, font size, scaling factor, etc.).

The scene can also be initialized with initial objects placed within the scene. The objects can also be added to the synchronized screen by either of the agents 112 or 122. The scene object includes a method for taking possession and passing control of any given object.

Touch input associated with the displays 111 or 121 or other input devices of the devices 110 and 120 can be operated by users of the devices 110 and 120 to interact with the objects. Input characteristics for original display position, speed, and trajectory on the source display 111 or 121 (display 111 or 121 where the input is received from a user) is noted by the agent 112 or 122) and the object is animated as moving across the source display 111 or 121 until the object reaches an out-of-bounds condition for the source display 111 and 121. At this point, the agent 112 or 122 passes the animated object with the input characteristics over the P2P connection 115 to the target display 111 or 121 where the receiving agent 112 or 122 takes possession of the object within the synchronized scene and continues to animate the object on that agent's display 111 or 121 based on the animated object's attributes, properties, and input characteristics.

Each agent 112 and 122 continually iterates processing (loops) looking for objects that need: to have possession transferred to the other agent 112 or 122, are being passed from the other agent 112 or 122, are being newly added through operation of an existing object, are being newly added through input received, and are being removed from the scene.

Some objects may include properties that permit the objects to bounce off of a boundary in one or both of the displays 110 and 120. For example, an object property may cause the agents 112 and 122 to bounce off of top and bottom boundaries of the displays 111 and 121 and to bounce off one side boundary in each of the displays 111 and 121 (such as the non-adjacent side boundaries between the two displays 111 and 121 when the displays 111 and 121 are arranged next to one another. The shared side boundary between the two displays 111 and 121 permit the object to be transferred from one display 111 or 121 to the other display 111 or 121 as if there were now actual physical boundary between the two displays 110 and 120 at the shared side boundary.

It is noted that the shared boundary can be a top or bottom boundary. It is also noted that when more than two displays 110 and 120 are synchronized for the same shared scene (through the screen object), the shared and unshared boundaries can be established or set, such that there can be multiple shared boundaries and arranged in a different manner from one another.

It is also noted that a processing state of any animated object may automatically generate a new object placed into the scene.

The system 100 permits multiple devices 110 and 120 to independently process animated objects with a synchronized scene and configured shared boundaries. Control for processing the animated object is passed over the P2P connection 115 between the devices 110 and 120 and independently processed by the agents 112 and 122.

In an embodiment, the first device 110 is a digital sign and the second device 120 is a digital sign. In an embodiment, the first device 110 is a digital sign and the second device 120 is a mobile device operated by a user. In an embodiment, one or more of the devices 110 and 120 is a Self-Service Terminal (SST) or a Point-Of-Sale (POS) terminal. In an embodiment, both devices 110 and 120 are mobile device operated by users.

In an embodiment, the devices 110 and 120 can be two or more of: a phone, a laptop, a desktop computer, a tablet, a wearable processing device, a digital sign, a POS terminal, an ATM, a kiosk, a self-service retail checkout, and an appliance that is part of the Internet-of-Things (IoTs).

In an embodiment, the scene object is a game and the animated objects are objects presented within the game.

In an embodiment, the scene object is an informational animated application and the animated objects are presented for interaction to obtain a user-directed piece of information (such as location of an item of interest, details on the item of interest, etc.).

In an embodiment, the scene object is an advertisement that is animated and synchronized across multiple displays 110 and 120 creating the visual appearance of one very large integrated and synchronized display for the advertisement.

In an embodiment, the devices 110 and 120 include cameras that process images and provide the processed image information as input to the agents 112 and 122. The scene object includes an avatar object that follows/tracks a user as the user moves from in front of one display 110 to another display 120. The devices 110 and 120 also include microphones and speech to text (S2T) and text to speech (T2S) processing. The S2T provides text input to the agents 111 and 121 and translates output text from the avatar to speech played over speakers of the devices 110 and 120. The avatar acts as a personal assistant to the user as the user passes displays 110 and 120 within an establishment. In an embodiment, the avatar follows the user throughout the establishment to answer any questions the user may have and provide information requested by the user while in the establishment.

In an embodiment, the agents 112 and 121 are implemented as mobile applications that can be downloaded, installed, and initiated on the devices 110 and 120 through a network connection to an application store.

These embodiments and other embodiments are now discussed with reference to the FIGS. 2-4.

Figure 2:
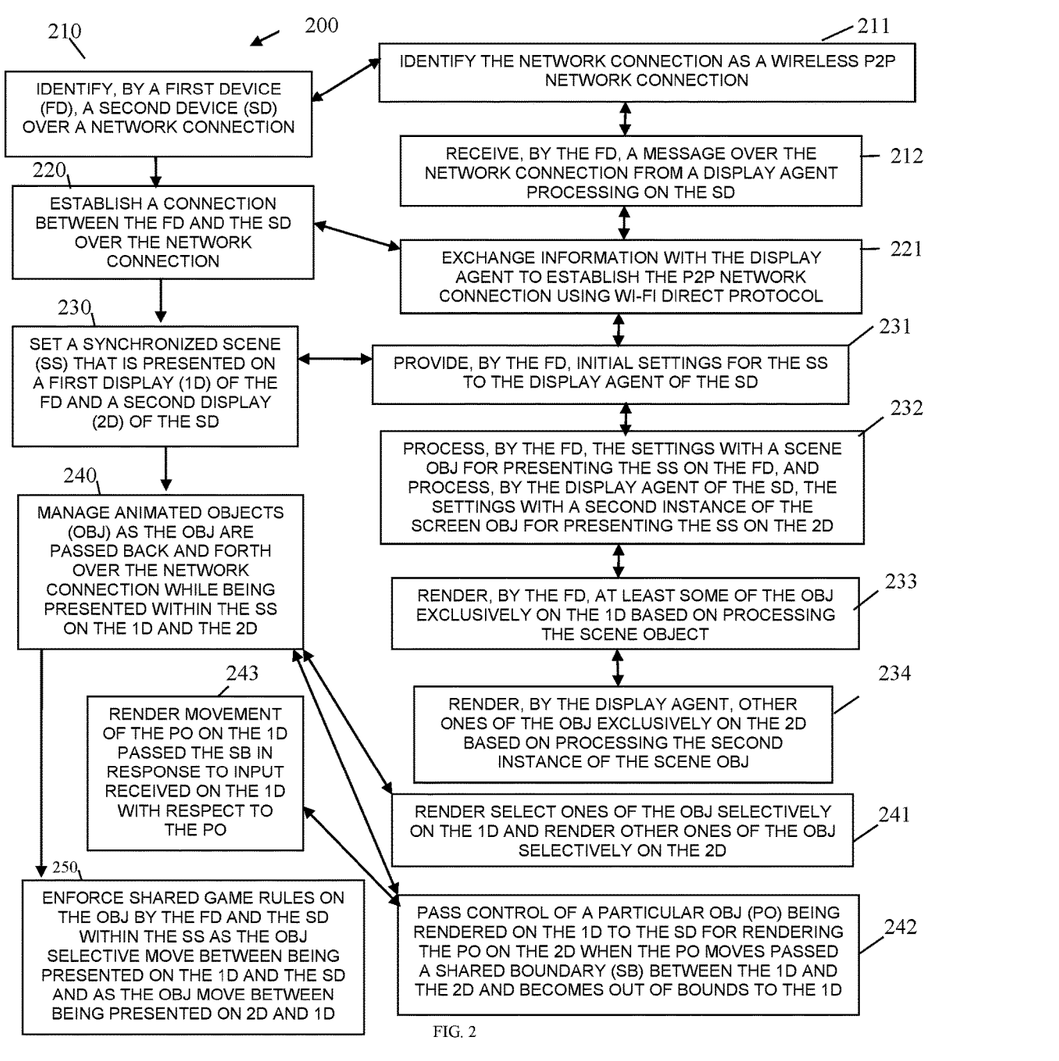
FIG. 2 is a diagram of a method for multi-device display processing, according to an example embodiment.

FIG. 2 is a diagram of a method 200 for multi-device display processing, according to an example embodiment. The software module(s) that implements the method 200 is referred to as a "display agent." The display agent is implemented as executable instructions programmed and residing within memory and/or a non-transitory computer-readable (processor-readable) storage medium and executed by one or more processors of a device. The processor(s) of the device that executes the display agent are specifically configured and programmed to process the display agent The display agent has access to one or more network connections during its processing. The network connections can be wired, wireless, or a combination of wired and wireless.

In an embodiment, the display agent is an instance of one of: the agent 112 and 122.

In an embodiment, the device that executes the display agent is one of: the device 110 and 120.

In an embodiment, the device that executes the display agent is one of: a tablet, a phone, a wearable processing device, a laptop, a desktop computer, a kiosk, a digital sign, an ATM, an appliance that is part of the IoTs, a kiosk, and a self-service retail checkout.

The display agent interacts with at least one separate and independent instance of the display agent that executes on a different device from the device that the display agent executes on.

Within the context of the processing for the display agent, it is noted that the display agent processes on a first device and interacts with a second display agent the processes on a second device. Each display agent controls at least one display that is associated with its device. The two display agents on multiple-devices control display processing for two separate displays cooperatively in the manners discussed above and below.

At 210, the display agent (processing on the first device), identifies a second device over a network connection.

According to an embodiment, at 211, the display agent identifies the network connection as a wireless P2P network connection.

In an embodiment of 211 and at 212, the display agent receives a message over the network connection from a second display agent that is processing on a second device.

At 220, the display agent establishes a connection between the first device and the second device over the network connection.

In an embodiment of 212 and 220, at 221, the display agent exchanges information with the second display agent to establish the P2P network connection using a Wi-Fi direct protocol.

At 230, the display agent sets a synchronized scene that is presented on the first display by the display agent and on the second display by the second display agent of the second device.

In an embodiment of 221 and 230, at 231, the display agent provides initial settings for the synchronized scene to the second display agent of the second device. This may include some initial animated objects in the synchronized scene that is presented on the second display but not necessarily on the first display.

According to an embodiment of 231 and at 232, the display agent processes the settings with a scene object for presenting the synchronized scene on the first display. Similarly, the second display agent of the second device processes the settings on a second instance of the scene object for presenting the synchronized scene on the second display.

In an embodiment of 232 and at 233, the display agent renders at least some of the animated objects exclusively on the first display based on processing the scene object.

In an embodiment of 233 and at 234, the second display agent renders other ones of the animated objects exclusively on the second display based on processing the second instance of the scene object.

At 240, the display agent manages animated objects as the animated objects are interactively and dynamically passed back and forth over the network connection while being presented within the synchronized scene on the first display by the display agent and the second display by the second display agent.

In an embodiment, 241, the display agent renders select ones of the animated objects on the first display while the second display agent renders other ones of the animated objects selectively on the second display.

In an embodiment, at 242, the display agent passes control of a particular animated object being rendered on the first display to the second display agent of the second device when the particular animated object moves passed a shared boundary between the first display and the second display and becomes out of bounds to the first display.

In an embodiment of 242 and at 243, the display agent renders movement of the particular animated object on the first display passed from the shared boundary in response to interactive input received on the first device with respect to the particular animated object.

According to an embodiment, at 250, the display agent and the second display agent enforce shared game rules for paying an interactive game within the synchronized scene as the animated objects moves between being presented on the first display to the second display and as the animated object moves between being presented on the second display to the first display.

Figure 3:
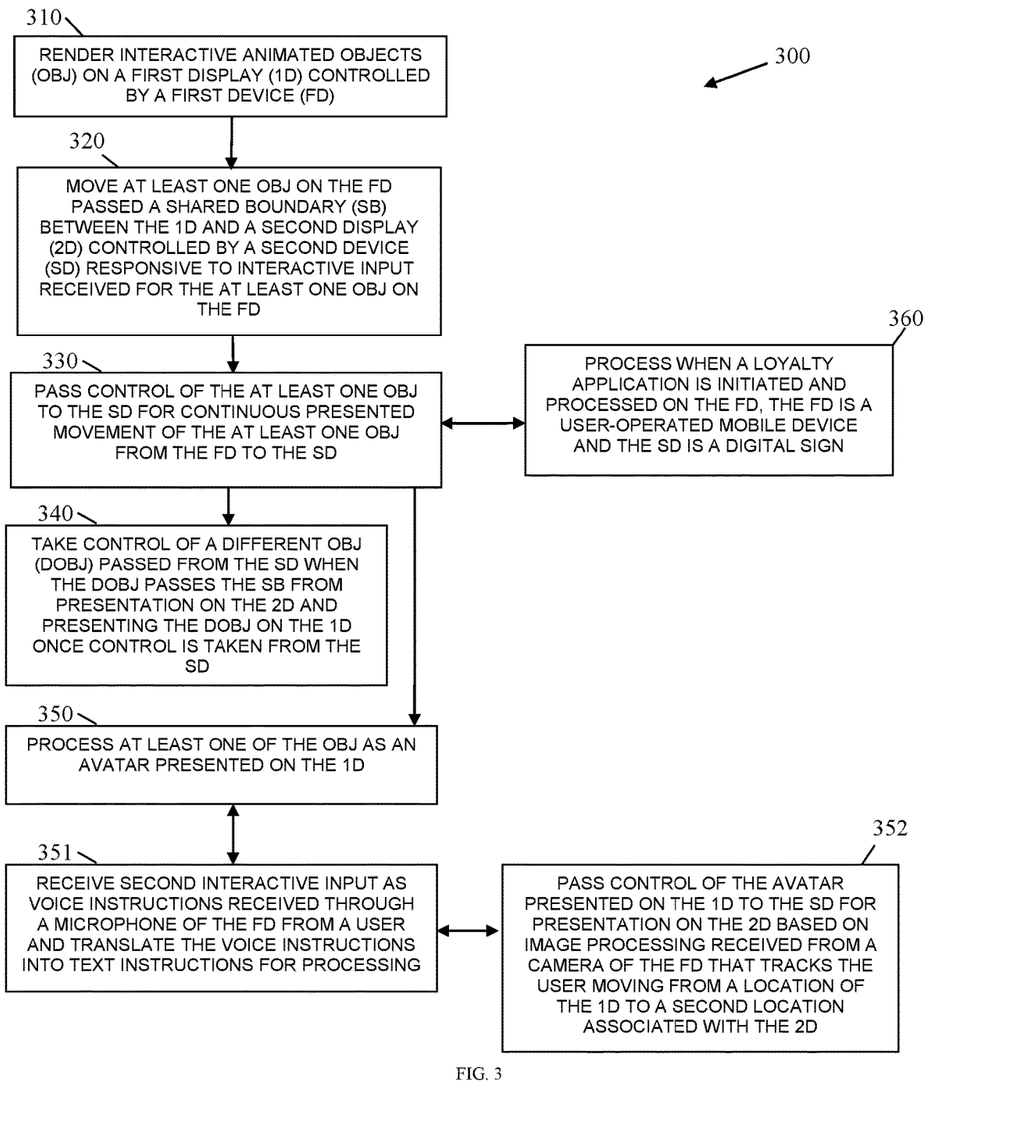
FIG. 3 is a diagram of another method for multi-device display processing, according to an example embodiment.

FIG. 3 is a diagram of another method 300 for multi-device display processing, according to an example embodiment. The software module(s) that implements the method 300 is referred to as a "mobile display application (app)." The mobile display app is implemented as executable instructions programmed and residing within memory and/or a non-transitory computer-readable (processor-readable) storage medium and executed by one or more processors of a device. The processors that execute the mobile display app are specifically configured and programmed to process the mobile display app. The mobile display app has access to one or more network connections during its processing. The network connections can be wired, wireless, or a combination of wired and wireless.

In an embodiment, the mobile display app is an instance of one of: the agent 112 and 122.

In an embodiment, the mobile display app is the method 200.

In an embodiment, the device that executes the mobile display app is one of: the device 110 and the device 120.

In an embodiment, the device that executes the mobile display app is one of: a tablet, a phone, a wearable processing device, a laptop, a desktop computer, a kiosk, a digital sign, an ATM, an appliance that is part of the Internet-of-Things (IoTs), a kiosk, and a self-service retail checkout.

The mobile display app presents another and in some ways an enhanced processing perspective of the method 200.

The mobile display app interacts with at least one separate and independent instance of the mobile display app that executes on a different device from the device that the mobile display app executes on.

At 310, the mobile display app renders interactive animated objects on a first display controlled on a first device that executes the mobile display app.

At 320, the mobile display app moves at least one interactive animated object on the first display passed a shared boundary between the first display and a second display controlled by a second mobile display app of a second device. The movement is responsive to interactive input received for the at least one interactive animated object on the first device.

The interactive input can be through touch when the first display is touch enabled. The interactive input can be based on spoken audio into a microphone. The interactive input can also be based on image processing information for images captured from a camera of the first device. Still further, the interactive input can be through a mouse, a stylus, a keyboard, or any input mechanism.

At 330, the mobile display app passes control of the at least one interactive animated object to the second display agent of the second device for continuous presented (rendered) movement of the at least one interactive animated object from the first device to the second device.

In an embodiment, at 331, the mobile display app processes when a loyalty application is initiated and processed on the first device. The first device is a user-operated mobile device and the second device is a digital sign. That is, the mobile display app is initiated when the user initiates the user's loyalty app on the user's mobile device.

According to an embodiment, at 340, the mobile display app takes control of a different interactive animated object passed from the second display agent of the second device when the different interactive animated object passes the shared boundary from presentation on the second display. Then, the mobile display app presents the different interactive animated object on the first display once control is taken from the second device.

In an embodiment, at 350, the mobile display app processes at least one of the interactive animated objects as an avatar rendered (presented) on the first display.

In an embodiment of 350 and at 351, the mobile display app receives second interactive input as voice (spoken) instructions through a microphone of the first device from a user and translates the voice instructions from an audio format to text instructions processed by the avatar.

In an embodiment of 351 and at 352, the mobile display app passes control of the avatar presented on the first display to the second mobile display app of the second device for presentation on the second display based on image processing for images captured from a camera of the first device. The image processing tracks the user moving from a location of the first display to a second location associated with the second display. In an embodiment, the first and second devices are digital signs and the avatar provides a personal assistance experience for the user as the user moves about an establishment. In an embodiment, the processing continues for more than two devices located in the establishment with each of the additional devices processing an instance of the mobile display app.

Figure 4:
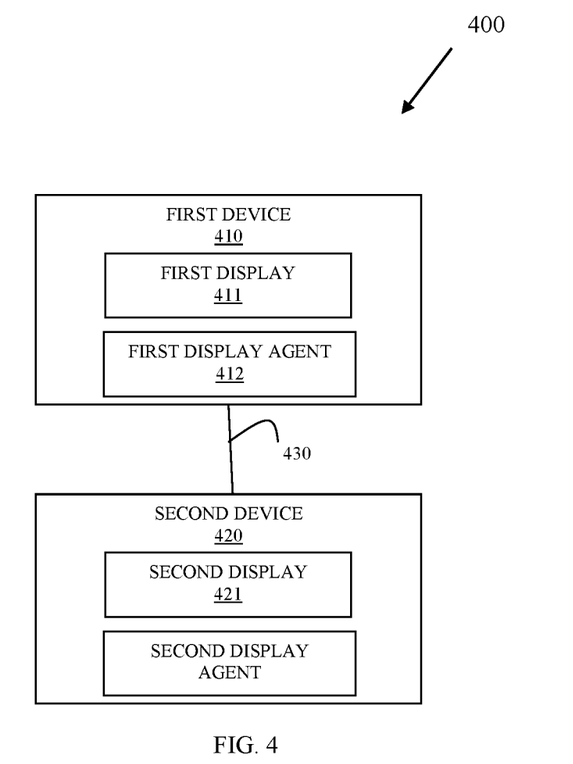
FIG. 4 is a diagram of a system for multi-device display processing, according to an example embodiment.

FIG. 4 is a diagram of a system 400 for multi-device display processing, according to an example embodiment. The system 400 includes a variety of hardware components and software components. The software components of the system 400 are programmed and reside within the memory of a non-transitory computer-readable medium and executes on one or more processors of the system 400. The system 400 may communicate over one or more networks, which can be wired or wireless or, a combination of wired and wireless.

In an embodiment, the system 400 is implemented on at least the device 110 and 120 of the FIG. 1.

In an embodiment, the system 400 implements, inter alia, the processing discussed above with the FIGS. 1-3.

The system 400 includes a first device 410 having a first display 411 and a first display agent 412 and a second device 420 having a second display 421 and a second display agent 422. The first display agent 412 executes on the first device 410 and controls presentations made on the first display 411. The second display agent 422 executes on the second device 420 and controls presentations made on the second display 421.

In an embodiment, the first device 410 is a different type of device from the second device 420.

In an embodiment, the first device 410 is a same type of device as the second device 420.

In an embodiment, the first device 410 and the second device 421 are both digital signs.

In an embodiment, the first device 410 and the second device 420 are two devices selected from any combination of: a tablet, a laptop, a digital sign, a desktop computer, a POS terminal, an ATM, a kiosk, a wearable processing device, a self-service checkout, and an appliance that is part of the IoTs.

The first display agent 412 and the second display agent 422 are further configured to establish a Peer-to-Peer (P2P) wireless connection 430 with one another, synchronize a scene presented on both the first 411 and second 421 displays, and manage selective presentation of interactive animated objects within the synchronized scene on the first 411 and second 421 displays by passing control and taken control of selective ones of the interactive animated objects.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

identifying, by a first device, a second device over a network connection;

establishing a connection between the first device and the second device over the network connection;

setting a synchronized scene that is presented on a first display of the first device and a second display of the second device, wherein setting further includes establishing, by the first device, the synchronized scene as a scene object and passes the scene object to the second device, the second device processes the scene object establishing the synchronized scene for both the first device and the second device, wherein setting further includes managing first boundaries of the synchronized scene on the first display based on first width, first height, first pixel density, first font size, and first scaling factors of the first display and managing second boundaries of the synchronized scene on the second display based on second width, second height, second pixel densities, second font size, and second scaling factors of the first display, and wherein setting further includes initializing the synchronized scene on both the first display and the second display with initial objects placed within the scene; and managing animated objects as the animated objects are passed back and forth over the network connection while being presented within the synchronized scene on the first display and the second display.

2. The method of claim 1, wherein identifying further includes identifying the network connection as a wireless Peer-to-Peer (P2P) network connection.

3. The method of claim 2, wherein identifying further includes receiving, by the first device, a message over the network connection from a display agent processing on the second device.

4. The method of claim 3, wherein establishing further includes exchanging information with the display agent to establish the P2P network connection using a Wi-Fi direct protocol.

5. The method of claim 4, wherein setting further includes providing, by the first device, initial settings for the synchronized scene to the display agent of the second device.

6. The method of claim 5, wherein providing further includes processing, by the first device, the settings with the scene object for presenting the synchronized scene on the first display, and processing, by the display agent of the second device, the settings within a second instance of the scene object for presenting the synchronized scene on the second display.

7. The method of claim 6, wherein processing further includes rendering, by the first device, at least some of the animated objects exclusively on the first display based on processing the scene object.

8. The method of claim 7, wherein rendering further includes rendering, by display agent of the second device, other ones of the animated objects exclusively on the second display based on processing the second instance of the screen object.

9. The method of claim 1, wherein managing further includes rendering select ones of animated objects selectively on the first display and rendering other ones of the animated objects selectively on the second display.

10. The method of claim 1, wherein managing further includes passing control of a particular animated object being rendered on the first display to the second device for rendering the particular animated object on the second display when the particular animated object moves passed a shared boundary between the first display and the second display and becomes out of bounds with respect to the first display.

11. The method of claim 10, wherein passing further includes rendering movement of the particular animated object on the first display passed the shared boundary in response to input received on the first device with respect to the particular animated object.

12. The method of claim 1 further comprising, enforcing shared game rules on the animated objects by the first device and the second device within the synchronized scene as the animated objects selectively move between being presented on the first display to the second display and as the animated objects selective move between being presented on the second display to the first display.

13. A method, comprising:
rendering interactive animated objects on a first display controlled by a first device;
moving at least one interactive animated object on the first display passed a shared boundary between the first display and a second display controlled by a second device responsive to interactive input received for the at least one interactive animated object;
passing control of the at least one interactive animated object to the second device for continuous presented movement of the at least one interactive animated object from the first display to the second display; and
maintaining a synchronized scene object on both the first display and the second display with initial objects placed within the synchronized scene object during the rendering, the moving, and the passing, wherein maintaining further includes establishing the synchronized scene object by the first device and passing by the first device the synchronized scene object to the second device, the second device processes the synchronized scene object.

14. The method of claim 13 further comprising, taking control of a different interactive animated object passed from the second device when the different interactive animated object passes the shared boundary from presentation on the second display and presenting the different interactive animated object on the first display once control is taken from the second device.

15. The method of claim 13 further comprising, processing at least one of the interactive animated objects as an avatar presented on the first display.

16. The method of claim 15, wherein processing further includes receiving second interactive input as voice instructions received through a microphone of the first device from a user and translating the voice instructions into text instructions for processing.

17. The method of claim 16, wherein processing further includes passing control of the avatar presented on the first display to the second device for presentation on the second display based on image processing information received from a camera of the first device that tracks the user moving from a location of the first display to a second location associated with the second display.

18. The method of claim 13 further comprising, processing the method when a loyalty application is initiated and processed on the first device, wherein the first device is a user-operated mobile device and the second device is a digital sign.

19. A system, comprising:
a first device comprising a first processor and a first non-transitory computer-readable storage medium comprising executable instructions representing a first display agent;
a first display;
a second device comprising a second processor and a second non-transitory computer-readable storage medium comprising executable instructions represent a second display agent; and
a second display;
wherein the first display agent when executed by the first processor from the first non-transitory computer-readable storage medium causes the first processor to and wherein the second display agent when executed by the second processor from the second non-transitory computer-readable storage medium causes the second processor to:
control, by the first display agent, the first display;
control, by the second display agent, the second display;
establish a Peer-to-Peer (P2P) wireless connection with one another;
establish by the first device a scene object for a scene;
passing by the first device the scene object for the scene to the second device;
processing by the second device the scene object;

synchronize the scene presented on both the first and second displays with the scene including initial objects placed within the scene; and manage selective presentation of interactive animated objects within the synchronized scene on the first and second displays by passing control and taken control of selective ones of the interactive animated objects.

20. The system of claim 19, wherein the first and second devices are digital signs.

* * * * *